United States Patent [19]

Rule et al.

[11] 4,110,484

[45] Aug. 29, 1978

[54] FLOW PROCESS FOR PRODUCTION OF IMITATION CHEESE

[75] Inventors: Charles E. Rule, Lakewood; Juan B. Ilagan; Donald E. Miller, both of Strongsville, all of Ohio

[73] Assignee: SCM Corporation, New York, N.Y.

[21] Appl. No.: 721,972

[22] Filed: Sep. 10, 1976

[51] Int. Cl.$^2$ ................. A23C 19/02; A23C 19/12
[52] U.S. Cl. .................. 426/582; 99/453; 99/460; 99/462; 99/466; 426/583; 426/519
[58] Field of Search ............ 426/582, 583, 519; 99/452, 453, 460, 462, 466; 259/6, 41

[56] References Cited

U.S. PATENT DOCUMENTS

| | | | |
|---|---|---|---|
| 3,419,250 | 12/1968 | Brennan, Jr. | 259/41 |
| 3,432,306 | 3/1969 | Edwards | 426/583 X |
| 3,618,902 | 11/1971 | Brennan, Jr. | 259/6 |
| 3,922,374 | 11/1975 | Bell et al. | 426/582 |

*Primary Examiner*—David M. Naff
*Attorney, Agent, or Firm*—Richard H. Thomas

[57] ABSTRACT

Imitation cheese is manufactured by a flow process from a plurality of edible ingredients comprising fat, protein, water, and flavor wherein the cheese product is set by the addition of an acidulant, in lieu of fermentation. The edible ingredients are introduced into an elongated, confined mixing zone in such a way that the acidulant and protein are in distinct and separate flow streams until in said zone, and in the zone are subjected, at a temperature of at least about 100° F, to medium-to-high intensity axial and radial flow mixing. The mixing is continued until a substantially homogeneous mixture is obtained.

16 Claims, 9 Drawing Figures

FLOW PROCESS FOR PRODUCTION OF IMITATION CHEESE

The present invention relates to a novel flow process for the manufacture of imitation, acid-set cheese product.

For purposes of the present application, an imitation cheese product (also referred to as a cheese alternate) is defined as (a) one in which both the protein and lipid systems are derived from non-dairy sources; (b) one in which the lipid system is replaced by a fat derived from a non-dairy source and the protein is from a dairy source. The latter type often is referred to as a "filled cheese" and the former type a purely "imitation cheese".

By acid-set, it is meant that process of manufacture in which an edible acidulant is added directly (referred to herein as an added or extraneous acidulant) to a mixture of the cheese-making ingredients as a substitute for the acid provided by a natural culture process. The acidulant can be any edible (i.e. "food grade") acid, such as lactic acid, tartaric acid, hydrochloric acid, phosphoric acid, acetic acid, citric acid, adipic acid, malic acid, and fumaric acid, acid salts of the same, or other substances known in the art.

The present invention is particularly applicable to the manufacture of imitation pasta filata type cheese such as mozzarella cheese, although it will be apparent from the following description that the invention broadly is useful in the manufacture of other cheese as well.

Mozzarella cheese can be characterized as a fresh cheese having a relatively bland flavor and a high moisture content, but less than about 50%. Recent federal regulations require, to satisfy school lunch programs, a moisture content in cheese alternates of no more than about 47%. The cheese is rubbery or stringy in nature, that is, provided with a high degree of stretch, and is hard so that it can be grated into flakes. It is frequently combined with other foods, for instance tomato sauce, in the preparation of pizza, and in this regard should have good melt-down characterister providing a continuous fused layer when baked. Further, the cheese should be firm, versus soft, and smooth in texture. Reference can be had to prior U.S. Pat. Nos. 3,531,297 and 3,692,540 for a further description of properties desired of pasta filata cheeses.

BACKGROUND OF THE INVENTION

The manufacture of imitation cheese products of the type to which the present invention relates is known. Such manufacture offers a number of advantages. For instance, the use of acid-set avoids the need for maintaining acid-producing micro-organisms conventionally employed in the cheese-making process. Also avoided are the formations of whey as a by-product and the accompanying need for separation and disposal of the same.

One such acid-set cheese product is disclosed in a prior Bell et al U.S. Pat. No. 3,922,374. In this patent, the cheese ingredients are said to be a fat having a Wiley melting point between about 90° and 110° F, the fat being about 12 to 35% of the cheese product; a calcium caseinate, sodium caseinate, or a combination of such caeinates in an amount equal to about 15 to 33% of the cheese product; up to about 5% ungelantinized flour; and about 0.5 to 1.8% adipic, lactic, citric, or malic acid, or combinations of such acids; and water, the cheese product having a pH of about 4.8 to 5.7 and including appropriate coloring and flavoring materials.

Traditionally, cheese is made on a batch-type basis, for instance in producing cultured products. Such products must be allowed to stand, and the process thus is not amenable to continuous operation and automation techniques. Reference is made to this problem in a prior Little U.S. Pat. No. 3,378,375, column 2 of the patent.

Even imitation and filled cheeses insofar as known to Applicants continue to be made using batch-type techniques. In said prior U.S. Pat. No. 3,922,374, the mixing is carried out in what is described as a high shear mixer sold by Littleford Brothers, Inc., Cincinnati, Ohio, U.S.A. This batch-type mixer includes a steam-jacketed, cylindrical chamber which has a filling door at the top and a discharge door at the bottom. The mixer is filled prior to processing and emptied when processing is completed. It is described as having a series of rotating arms the outer ends of which have a plow-shaped impeller or mixing element fitting the inner surface of the chamber and projecting material away from the inner surface, hurling the same towards the axis of the chamber. Protruding from the lower wall of the vessel and into the chamber are a series of high-speed blending choppers which are spaced between the mixing arms. The choppers rotate at high speed to break up agglomerates.

It is a characteristic of the process of this patent that a particular sequence of addition of the cheese formulation ingredients is used, necessitating the use of a batch mixing apparatus or process. In particular, the process of the patent employs what is called in-situ forming of caseinate, described as the addition of casein to the mixing chamber, as hydrochloric casein, followed by addition of a base, such as calcium hydroxide, reactable with the casein during the mixing operation. It is pointed out in the patent that the in-situ forming is necessary towards obtaining an acceptable product, particularly for certain uses.

It is believed that a principal problem with the manufacture of imitation cheeses by the process of acid-setting, heretofore requiring a batch-mixing operation, is that the addition of an edible acid such as lactic acid to a casein-containing mixture causes premature agglomeration resulting in the production of an uneven curd of varying quality. In accordance with the above-mentioned Little U.S. Pat. No. 3,378,375, it is surmised that the acid overacidifies portions of the casein-containing product causing premature precipitation of these portions while other portions which are the last to be acidified form a large, hard, coarse curd. By comparison, when bacteria cultures are employed, the acid is formed slowly, uniformly and in situ so that the acidity of the milk product lowers slowly and uniformly. Even when concentrated acids are added slowly and under proper conditions of temperature and agitation, a consistently uniform product is still difficult to obtain. Also, this requires additional time, detracting from the attractiveness of the procedure. Also reference can be had to Little U.S. Pat. No. 3,792,171 on this same subject.

SUMMARY OF THE INVENTION

The present invention provides a novel flow process for the manufacture of acid-set imitation cheese product from a plurality of edible food ingredients comprising fat, protein, water, flavoring and added acidulant capable of coagulating said protein in admixture with the other food ingredients. The process comprises establishing and maintaining a pair or more of flows of said ingredients into an elongated, confined mixing zone, the flow containing said acidulant being substantially distinct from the flow containing said protein until the flows enter said zone. In the mixing zone, the ingredients are subjected to at least medium high intensity axial and radial flow mixing at a temperature of at least about 100° F, the net horsepower input into the mixing zone being at least about 2 horsepower per 40 pounds of the ingredients therein. The flow mixing is continued until a substantially homogeneous mixture is obtained followed by discharge of the homogeneous mixture from the zone.

The term "medium-to-high intensity" is an art-recognized term in the plastics art, based primarily on horsepower consumed in the mixing step. High intensity mixing employs about 1 horsepower per 0.5–2.0* pounds of mix, whereas the horsepower consumption in medium-to-high intensity mixing is somewhat less, on the order of 1 horsepower per 5.0 to 10.0 pounds of mix. In the present invention, a preferred range of operation is about 2 to 5 horsepower per 40 pounds of mix. Horsepower consumed is net horsepower equal to gross horsepower consumption minus horsepower consumed by the mixing apparatus without any load.

* Modern Plastics Encyclopedia, 1975-1976, page 432.

An important aspect of the present invention resides in the use of both axial and radial flow in the mixing process of the present invention. To Applicants' knowledge, mixing in the manufacture of imitation cheese products has not in the past employed the steps of flowing in at least a pair of flows of the food ingredients into the mixing zone, with the protein and acid being in separate flows, and then using both radial and axial flow mixing in said zone while employing a horsepower input of at least 2 horsepower per 40 pounds of mix. As with the term "medium-to-high intensity", "axial and radial flow mixing" are also terms of art defining the dominant directions of flow of the ingredients being mixed while in the mixing zone. It will become apparent from further description that predominantly radial flow can be obtained by impellers of one geometry and predominantly axial flow by impellers of a different geometry. In a preferred embodiment of the present invention, the mixing is carried out in the mixing zone utilizing predominantly radial flow impellers interspersed with axial flow impellers. However, essentially the same effect could be obtained by the use of back-pressure impellers or flow restrictors interspersed with radial flow impellers to obtain a radial flow but at the same time axial flow mixing.

Another critical aspect of the present invention resides in maintaining the acidulant flow separate and distinct from the protein-containing flow until said flows are in the mixing zone. Preferably, the protein (e.g., caseinate is introduced in a dry mix form with other dry ingredients into an axial flow portion of the mixing zone, and the acidulant is then added with other liquid ingredients. Since the acidulant is employed in relatively small amount, optimum mixing is obtained by adding it with at least one other major liquid ingredient, preferably with both the oil and water.

The viscosity of the cheese-making food ingredients in the mixing zone is quite high, for instance at least about 55,000 centipoises at about 140° F, and higher at lower temperatures. In order to reduce the viscosity, the mixing temperature must be above 100° F. A preferred mixing temperature is at least about 140° F. The cheese formulation may include vitamins and other ingredients which are heat degradable, in which case the mixing temperature should be less than about 160° F. Heat can be introduced into the mixing zone to maintain a desired temperature, but an initial temperature in the mixing zone above room temperature can be achieved by preheating certain liquid ingredients prior to introducing them into the mixing zone.

BRIEF DESCRIPTION OF THE DRAWINGS

The invention and objects and advantages thereof will become apparent from the following description and drawings in which.

Figure 1:
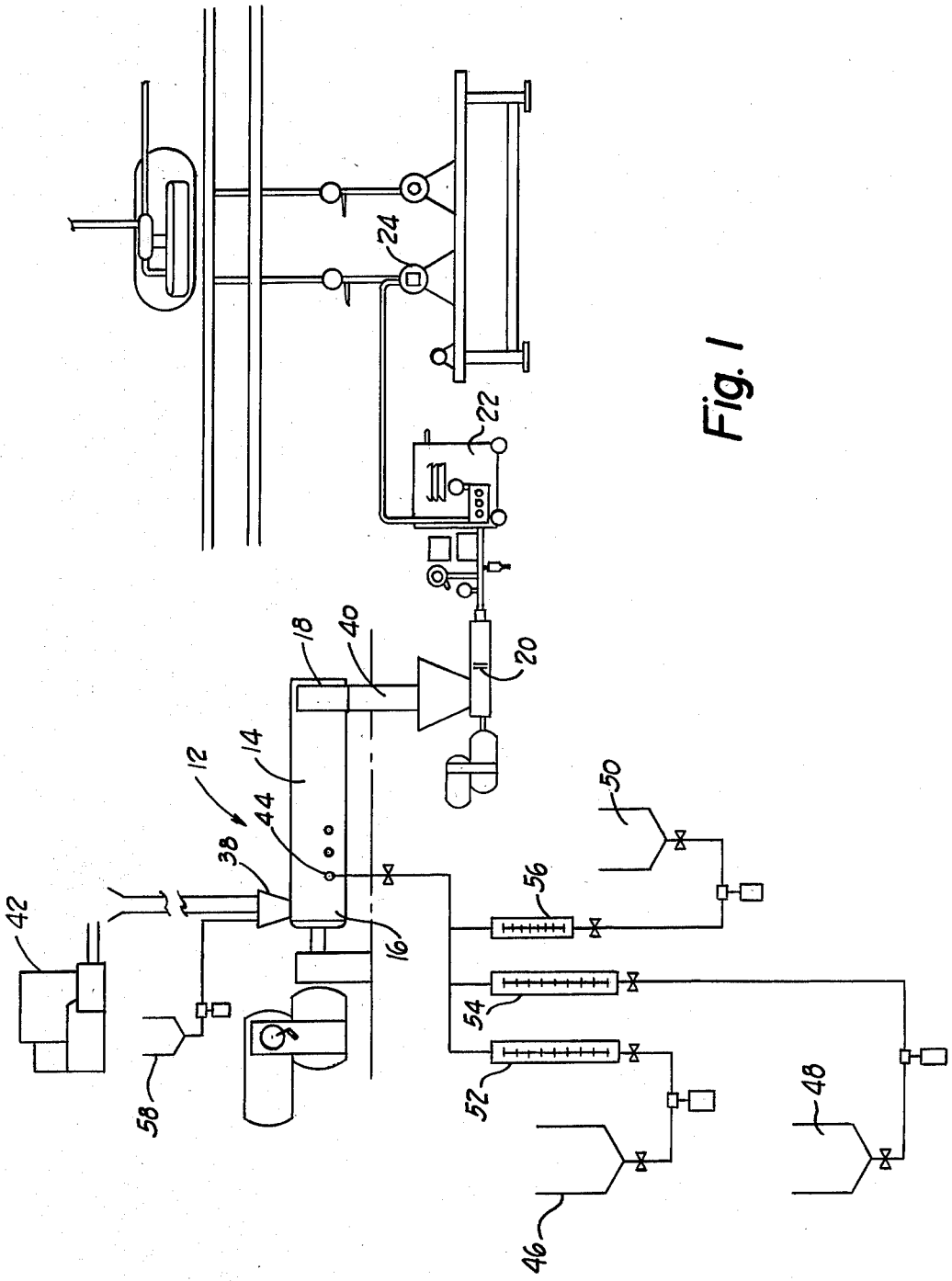
FIG. 1 is a schematic, elevation view of a flow mixing apparatus and associated equipment useful in the process of the present invention.

Referring to the drawings showing a preferred embodiment of the invention, the flow mixing apparatus 12 (FIG. 1) includes a horizontal, longitudinally elongated barrel or casing 14 housing a means (to be described) for mixing cheese ingredients in their passage therethrough. The cheese ingredients are introduced in continuously maintained flow streams into the mixing apparatus adjacent an inlet end 16, and are removed from the apparatus as a substantially homogeneous mixture adjacent a discharge end 18. Also shown in FIG. 1 is a transfer pump 20 to transfer the ingredients from the discharge end 18, a homogenizer 22 and a swept wall heat exchanger 24 for cooling the homogenized cheese product and extruding the same to packaging equipment.

Figure 3:
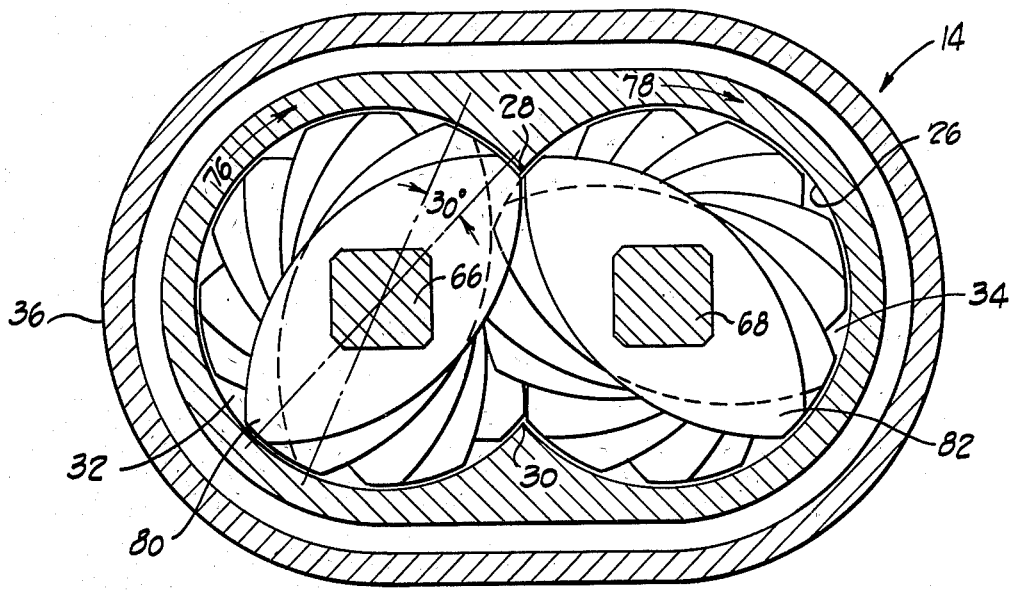
FIG. 3 is a section view taken along line 3—3 of FIG. 2.

Details of the cross-section through the barrel 14 of the mixing apparatus are shown in FIG. 3 including an inner wall 26 in the form of side-by-side circular major arcs of equal radii intersecting at 28 and 30 to provide side-by-side intersecting cylindrical chambers 32 and 34 communicating with each other through the opening between intersections 28 and 30. The barrel 26 is surrounded by a jacket 36 into which a heat exchange medium is circulated.

The top wall of the barrel is provided adjacent to its inlet end wall 16 with an inlet 38 through which the cheese formulation ingredients to be mixed are introduced, and at the discharge end 18 with a lateral side wall discharge duct 40. At an elevation above the mixer, the apparatus of the present invention includes a vibratory screw feeder 42 by which dry mix ingredients are metered into the flow mixer through inlet 38. The mixer is also provided with an injection port 44 for liquid ingredients of the cheese formulation. As will be described subsequently, these include oil, water, emulsifier, acid and other ingredients. For such ingredients, there is provided an oil tank 46, a water, coloring and emulsifier tank 48, and an acid tank 50. Connections including flow meters 52, 54 and 56 extend from the respective tanks to the injection port 44. Also provided is a flavor tank 58 with a connection leading to inlet 38.

Figure 2:
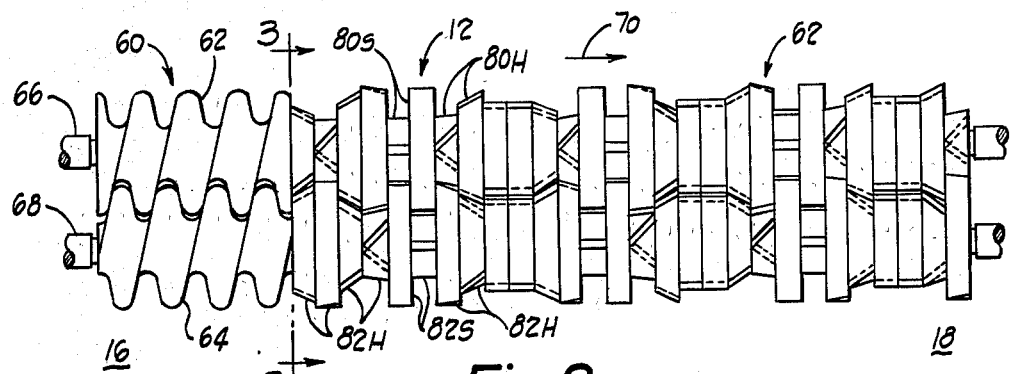
FIG. 2 is an enlarged, plan view of a preferred arrangement of mixing elements in the flow mixing apparatus of FIG. 1.

One flow mixer 14 which may be employed in the process of the present invention, particularly that shown in FIGS. 2 and 3, is a Readco "Continuous Processor", described as the 5 × 36 inch model, manufactured by Teledyne Readco and disclosed in prior U.S. Pat. Nos. 3,618,902 and 3,419,250. The subject matters of these patents are incorporated by reference herein. The swept wall heat exchanger 24 can be one manufactured by Chemetron Corporation and disclosed in U.S. Pat. No. 3,455,700, particularly the "C" unit "Votator" shown in the patent, referred to as an off-center rotating chiller. The particular model employed in the present invention is identified as the 3 × 12 inch unit. Some other manufacturers of suitable mixing apparatus for use in the process of the present invention include Baker-Perkins Inc., Werner and Pfleiderer Corporation, and Farrel Company Division of USM Corporation. Another suitable mixing apparatus is one made by the Fitzpatrick Company, referred to as the Model "M" "Malaxator", Code 600. The particular homogenizer shown is CP Model 3DDL-3436 manufactured by Crepaco, Inc. Other similar units can be employed.

In the plastics art, these mixers are referred to as axial mixing agitators. Ordinarily, they are either multiple rotor mixers with relatively simple barrel geometry or single rotor mixers with complex barrel geometry. They give a rigorous mixing with a tortuous but short path. Some of the multiple rotor mixers have intermeshing, counter-rotating rotors, but some as in the case of the Readco apparatus of FIGS. 2 and 3 operate with two rotors rotating in the same direction. As will be shown, they shear, knead, stretch and part the material in flow, dividing it and re-combining it many times.

Referring to FIGS. 2 and 3, the mixing apparatus barrel, in a longitudinal direction, is divided into a feed section 60, adjacent the inlet end of the mixer, and a mixing section 62 throughout the remainder of the barrel. The inlet feed section is provided with a pair of intermeshing feed screws 62 and 64 which are secured to parallel shafts 66 and 68, respectively, the screws having a spiral shape pitched to advance material in the direction of arrow 70 from the inlet end 16 towards the remainder of the barrel. The purpose of the feed section is to move the food ingredients quickly into the zone of high intensity mixing, and only relatively low intensity axial flow mixing is carried out in the feed section.

Extending through the remainder of the barrel and projecting beyond the end walls thereof are the shafts 66 and 68 disposed, respectively, coaxially of the cylindrical chambers 32 and 34, as shown in FIG. 3. The ends of the shafts which project through the end wall at the inlet end are journaled in suitable bearings and are connected with a speed reducer 72 and motor 74 (FIG. 1). The ends of the shaft which project through the opposite end wall are also suitably journaled.

The shafts 36 and 38 are arranged to be rotated in the same direction as indicated by the directional arrows 76 and 78 in FIG. 3. Fixed on the shaft 66 for rotation therewith but axially slidable therealong, to facilitate assembly and disassembly, are a plurality of contiguous paddles 80 identical in cross-sectional configuration. The paddles are arranged for substantial interengagement with laterally adjacent similar paddles 82 on the shaft 68. In a preferred embodiment, as best shown in FIG. 2, certain of the mating paddles are twisted on a helix and are identified by the suffix "H", the direction of twist of these paddles and their direction of rotation being such as to impart a forward-conveying movement to the material in addition to effecting mixing of the material. These can be referred to as the moving paddles. Other mating paddles are non-helical or flat and are identified by the suffix "S", these paddles having primarily a mixing action and being identifiable as mixing paddles.

In the embodiment illustrated in FIG. 2, for the process of the present invention, the sequence of moving paddles to mixing paddles in the direction of flow is as follows: three moving paddles followed by three mixing paddles; a moving paddle and then three more mixing paddles; a fifth moving paddle followed by three more mixing paddles; a sixth moving paddle followed again by three more mixing paddles; and then two moving paddles, the last two being pitched in a reverse direction to provide a partial brake to the flow of material in the barrel. This sequence seemed to provide optimum shear in the mixing of the high viscosity material. It is of course understood that the paddle configuration, number and arrangements of paddles can be varied. As indicated above, a suitable arrangement could be a series of axial flow paddles with reverse direction or brake paddles, etc., in the sequence.

All of the paddles in any cross-section normal to the axes of the shafts are lenticular in shape, the paddles having convex flanks the radial outer ends of which are joined by arcuate crests. The cross-sectional configuration of the paddles and the relation of one to another is such that when rotated at the same speed and in the same direction they will interengage, with each of the crests of one paddle following a respective flank of its mating paddle and having therebetween a clearance. Additionally, the relation of the paddles with respect to the arcuate walls of the barrel defining the chambers is such as to provide a clearance between the paddle crests and the walls of the chambers.

As disclosed in U.S. Pat. No. 3,618,902, the clearance between the paddle crests and the walls of the chambers is approximately 1% of the major diameter of the paddles. The clearance between the paddles is greater than the clearance between the paddles and the chamber walls. For purposes of the present invention, these are referred to as clearances $C_1$ and $C_2$, respectively. The ratio of $C_2$ to $C_1$ varies from about 2:1 to about 5:1. In a particular embodiment of the process of the present invention, paddles having a major diameter of 5 inches, a clearance of 1/16 inch was provided between the paddle crests and the walls of the enclosing chamber ($C_1$), and a clearance of 1/16 inch was provided between the paddles at their closest approach.

Figure 4:
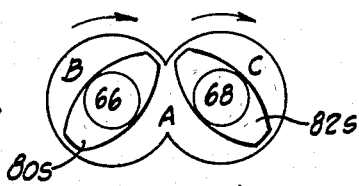
FIGS. 4–9 diagrammatically show a pair of cooperating, interengaging mixing elements in progressive positions of rotation revealing the change in size of pockets formed between these elements and their manner of operation.
Figure 5:
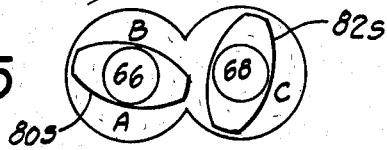

Referring to FIGS. 4–9, the rotation of a mating pair of non-helical or straight paddles, identifiable by the suffix "S", at successive 30° of rotation are shown illustrating the manner in which the elements function. In the position of FIG. 4, pocket A between the paddles has its maximum volume while pockets B and C on the outer periphery of the chambers have their minimum volumes. As the paddles rotate from the FIG. 4 to FIG. 5 position, pocket A gets progressively smaller while pocket B gets larger and pocket C remains the same. The cheese formulation being mixed is relatively incompressible and consequently is extruded through the clearance between the crests of the left-hand paddle and the flank of its mating paddle, from the pocket A of decreasing volume into the pocket B of increasing volume. Since the crest of the left-hand paddle and the flank of the right-hand paddle are actually moving in opposite directions to each other, very high shear rates result which in turn results in good mixing of the cheese.

A small amount of material may be extruded from pocket A to pocket B through the smaller clearance between the crest of the paddle and wall of the chamber 20. However, for equal clearance, the shear and consequent mixing of the material is considerably more efficient between the mutually rotating paddles than between the paddle and the stationary wall of the chamber, and for this reason a minimal clearance is provided between the crests of the paddles and the stationary chamber walls.

Figure 6:
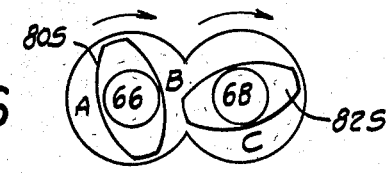
Figure 7:
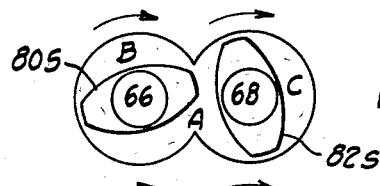
Figure 8:
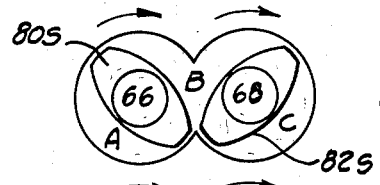
Figure 9:
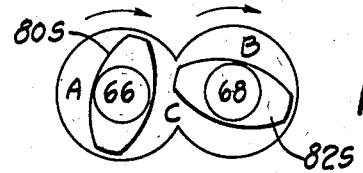

The remaining FIGS. 6, 7 and 8 show the effect as various pockets increase or decrease in volume, to the position of FIG. 9 wherein the paddles have rotated a full 180°. The same sequence of events occurs between the paddles identified by the suffix "H" which provide a forward-conveying movement to the material in addition to effecting mixing.

It is understood that the number and arrangement of mixing and forward movement paddles can be varied, as well as the pitch of the paddles, depending upon retention time desired.

The following example illustrates the concepts of the present invention.

EXAMPLE

Illustrated in this example is the manufacture of a mozzarella pizza-type cheese for use on pizza pies. The formulation employed was as follows:

| Ingredients | Percent |
| --- | --- |
| Water | 45.29 |
| Hydrogenated soybean oil (Durkee's 321) | 24.63 |
| Sodium caseinate | 20.40 |
| Calcium caseinate | 5.10 |
| Sodium chloride | 1.70 |
| Octaglycerol monooleate (8-1-0) | 1.00 |
| Calcium chloride | 0.97 |
| Lactic acid | 0.30 |
| Flavor | 0.35 |
| Potassium sorbate | 0.13 |
| Vitamin-Mineral Premix | 0.10 |
| Color | 0.03 |

The specifications for the hydrogenated soybean oil were:

| WMP (° F) | | 95–98 |
| --- | --- | --- |
| SFI at | 50° F | 39–45 |
| | 70° F | 22–28 |
| | 80° F | 20–24 |
| | 92° F | 4–8 |
| | 100° F | 3 max. |

A homogeneous blend of the dry ingredients (sodium caseinate, calcium caseinate, sodium chloride, calcium chloride, potassium sorbate and vitamin-mineral premix) were placed in a ribbon blender (not shown) in which they were blended and introduced into the flow mixer in inlet 38 via the vibratory screw feeder 42. Water, the emulsifying agent (8-1-0) and color ingredients were added to the water tank 48 and were heated to 175° F, at which temperature they were maintained. Oil was placed in the oil tank 46 and was heated to 195° F, at which temperature it was also maintained. Lactic acid was placed in the third tank 50 and was maintained at a constant temperature of about 75° F. The flavor tank 58 received the flavor components and was maintained at a constant temperature of about 160° F.

The vibra screw was calibrated so that it introduced the dry ingredients into the mixer at an even flow of about 56 pounds per hour. The liquid pumps and metering devices were also metered to introduce the liquid components at a rate to provide the percentage of ingredients called for. Preferably, the liquid materials entered the injection port of the flow mixer in a homogeneous state at a temperature of about 142° F. The jacket of the flow mixer was heated so that the product temperature at the exit port was about 160° F.

In this example, the flow mixer 14 has a capacity of about 3.75 gallons, or about 40 pounds of mix.* The mixer was operated in several different runs under a number of different conditions to illustrate aspects of the present invention. These are set forth in the following Table 1.

* The density of the mix when molten is about 0.989 gram per milliliter.

Table 1

| Run | RPM | Net H.P. | #/hr. of formulation mixed | Product outlet Temp.° F | Comment |
| --- | --- | --- | --- | --- | --- |
| 1 | 70 | (1–2 estimated) | 200 | 130° | Product unsatisfactory |
| 2 | 129 | 2–3 | 200 | 160° | Product satisfactory** |
| 3 | 129 | 4–5 | 400 | 160° | Product satisfactory |
| 4 | 129 | | 200 | 136–144° | Product unsatisfactory |

**A satisfactory product was one that was substantially homogeneous. Shredding properties were good, as were melt-down properties when employed on a pizza product. The latter was good, the melted cheese being stringy or rubbery in nature. An unsatisfactory product was one which was non-homogenous. On heating, oiling off or separation of oil from the product was experienced.

The horsepower determination was made by placing a wattmeter on the motor power consumption, and deducting, from the reading obtained, horsepower or wattage consumed when the mixer is operated with no load. In other words, a part of the power consumption is friction and other losses resulting from movement of component parts of the mixer.

From the above data, it is evident that horsepower input, amount of ingredients being mixed, and temperature are interrelated. By extrapolation of the above and other data, it was determined that the net horsepower input must be at least about 2 per 40 pounds of mix, and temperature must be at least 100°, preferably 140° F.

No specific viscosity readings were taken on the products of the respective runs, because of the high viscosity of the product and the difficulty in taking viscosity readings. However, in a separate viscosity test, it was determined that the product had a viscosity of at least about 55,000 centipoises at about 140° F. The viscosity at 180° F was measured at about 9,000 centipoises, and about 33,000 centipoises at 160° F. The viscosity readings were taken with a Hanke Rotovisco Viscometer with an MV3 spindle. The cheese product is non-Newtonian and thixotropic, and the viscosity data is, therefore, only approximate. However, the data is evidence of the highly viscous nature of the cheese product of the present invention.

Following mixing, the cheese product at a temperature of about 160° F was transferred by means of the Moyno transfer pump to the homogenizer 22 where it was subjected to homogenization at a temperature of about 140° F. From the homogenizer, the product was pumped to the swept wall heat exchanger 24. In this unit, the product was cooled to about 70° F and was extruded into a shrink-film wrapper. The extruded product was packaged and stored at about 40° F until ready for use.

As an alternative, the product from the mixer can be introduced directly into a piston filler from which it is extruded into 5-pound fiber boxes with a polyethylene liner, the filling and packaging steps taking place at an elevated temperature of about 160° F. The only purpose of the swept wall heat exchanger is to cool the product prior to packaging, which is not necessary. The homogenizer also is not essential as the product from the mixer is in a substantially homogeneous state.

An important aspect of the present invention resides in employing a confined mixing zone. By confined it is meant having a slenderness ratio (width to length) of significantly less than 1:1, and a limited free area (defined as internal volume of the mixer minus volume occupied by the mixer shaft and impellers) such that the mix substantially completely fills the mixer and a net axial direction of movement of flow in the mixer is obtained. Preferably the slenderness ratio is less than about 1:3.

In the above example, the mixing zone internal dimensions (of the Readco mixer) were about 5 × 36 inches diameter to length. This gives a slenderness ratio of about 1:7. The mixer has an internal volume of about 705.6 cubic inches or about 0.408 cubic feet. This is equal to 5.5587 gallons. The paddles and shafts on which they are rotated occupy a space equal to about 1.808 gallons. Thus, about 32.5% of the volume of the mixer is occupied by the shafts and paddles, or 77.5% by the mix itself. The mixer is designed to be completely filled during the mixing step.

A test was carried out employing the aforementioned Littleford mixer, Model No. FKM 130 D, having a total volume of 4.6 cubic feet and a working capacity of 3 cubic feet. The slenderness ratio was about 1:1. The run was conducted with a recommended batch of 161 pounds of mix, which less than half filled the mixer. The cheese formulation was essentially the same as that of the above example, having a moisture content of about 47%. Water and oil were introduced into the mixer at about 165° F. Horsepower consumption was about 5000 watts or about 6.7. At no load, the horsepower consumption is about 2.1. Thus, the net consumption of 4.6 horsepower for 161 pounds of mix was equal to about 1:15 horsepower for 40 pounds of mix. An unsatisfactory product was obtained. Although the explanation lies in part in the fact that the mixing was not medium-to-high intensity, i.e., at least 2 horsepower input, part of the reason for the product being unsatisfactory lies in the fact that a confined mixing zone was not employed.

For formulation employed in the manufacture of the cheese product can be varied widely, depending upon the type of cheese being made. Even in the manufacture of a mozzarella or other pasta filata cheese, the formulation can be varied. In this regard, reference can be had to prior copending application Ser. No. 489,583 which application is incorporated by reference herein. In such application, a number of different cheese formulations are set forth. All of the cheese formulations are somewhat similar to that set forth in the above example, containing both sodium and calcium caseinate as the protein, a hydrogenated oil as the fat component, an edible acid, some calcium chloride, water and flavoring. It is not necessary that the formulation contain an emulsifying agent such as the octaglycerol monooleate (8-1-0). However, the use of such an emulsifying agent is desirable as a more homogeneous product is obtained as a result of its use. In this regard, preferred emulsifying agents for the process of the present invention include: octaglycerol monooleate ("8-1-0"); decaglycerol decaoleate ("10-10-0"); ethoxylated partial glycerides; ethoxylated sorbitan esters; sucrose esters; phospholipids such as lecithin; partial glycerides rich (about 40-95%) in monoglycerides; and mixtures of the foregoing; wherein the fatty acid moieties of such ester emulsifiers contain 16-22 carbon atoms.

Although the invention was described with reference to the manufacture of imitation pasta filata type cheese such as mozzarella cheese, the invention is broadly applicable to the manufacture of any imitation cheese. The invention is most applicable to the manufacture of imitation cheeses which are homogeneous in nature and which are hard. The term "homogeneous" is used in its common sense, a non-homogeneous cheese by way of example being a blue cheese. The term "hard" is also used in its ordinary sense with respect to cheese. By way of example, a soft cheese, with which the present invention is not as applicable, is a cottage cheese, a Neufchatel cheese, or a cream cheese. A list of imitation cheese with which the present invention is particularly useful includes but is not limited to imitation cheddar, Cheshire, brick, colby, muenster, Romano, parmesan, American, and Swiss cheeses. By way of example, for the manufacture of imitation cheddar cheese, it is a simple matter to change the color, flavor and texture forming ingredients. For imitation American cheese, a suitable slicer can be employed at the mixer discharge end.

It is understood that the term "homogeneous" in the present application applies only to the continuous phase of the cheese at the continuous mixer discharge. It is not meant to exclude the inclusion of certain ingredients commonly added to a cheese-making formulation, but which would not necessarily be uniformly or homogeneously distributed in the cheese product by the process of the present invention. Such ingredients by way of example are pimiento chunks, jalepeno pepper chunks, olive chunks and caraway seeds, or other such ingredients which could constitute a discontinuous phase of the cheese. Their addition to the cheese formulation is within the scope of the present invention.

Even air or gas could constitute a discontinuous phase of the imitation cheese. Thus, the manufacture of an imitation Swiss cheese is within the scope of the present invention, in its broadest respect. The imitation cheese continuous phase can be manufactured following the concepts of the present invention to produce a homogeneous product having the flavor of Swiss cheese, and then such phase can be injected with air or innocuous gas or a readily volatile innocuous liquid that is subsequently vaporized in the cheese body to produce the multiple holes which are characteristic of Swiss cheese.

In its broadest aspect, the present invention with flavor and color control can be employed in the manufacture of a discontinuous imitation cheese such as an imitation blue cheese. This can be accomplished by preparing the major off-white phase of the imitation blue cheese in the instant continuous mixer, then blending or layering strips or pieces of that phase with very dark layers, flakes or strips of the greenish blue mold or an edible cheese analog resembling the blue cheese mold in color and flavor to approximate a natural blue cheese. Similarly, the present invention can be practiced in the manufacture of an imitation Camembert or similar cheese having a denser, tougher rind and softer inner core. In this case, a core extrudate is readily prepared following the concepts of the present invention; then it is sandwiched between strips of thin, darker-colored rind prepared in separate apparatus. The resulting laminate is cut into desired shape and packaged. Alternatively, soft core pieces can be wrapped with such thin rind and packaged.

It will be readily apparent to those skilled in the art that the process steps in accordance with the concepts of the present invention can be carried out aseptically, e.g. as to the feed of the raw materials, their processing, and even the packaging of the imitation cheese product.

What is claimed is:

1. A process for the continuous manufacture of acid-set imitation cheese products comprising the steps of
    preparing a dry blend of dry, edible ingredients including at least one metal caseinate, sodium chloride and calcium chloride;
    preparing a liquid blend of liquid, edible ingredients including oil, water, emulsifying agent, acidulant and flavoring;
    continuously introducing said dry blend into an elongated, confined mixing zone of small cross-sectional area;
    continuously introducing said liquid blend into the dry blend;
    continuously subjecting said blends to medium high intensity mixing while conveying the resulting mixture of said mixing through said zone until a substantially homogeneous mixture is obtained;
    maintaining said mixture at an elevated temperature of at least about 100° F during said mixing;
    continuously withdrawing imitation cheese products from said elongated, confined mixing zone;
    said mixing zone including radial and axial flow, the proportions of said dry blend and liquid blend ingredients producing a substantially incompressible mixture of high viscosity; said mixing being carried out at a net horsepower input at the rate of about 2-5 per 40 pounds of edible ingredients.

2. The process of claim 1 wherein said cheese products are an acid-set imitation mozzarella cheese having a water content of less than about 50%.

3. The process of claim 1 wherein said acidulant is lactic acid, and said oil is a hydrogenated vegetable oil, the proportions of ingredients providing a mixture having an average mixing viscosity of about 75,000 centipoises in said zone.

4. The process of claim 3 wherein one of the edible ingredients is an emulsifying agent.

5. The process of claim 4 wherein said emulsifying agent is octaglycerol monooleate (8-1-0).

6. The process of claim 1 wherein said dry ingredients are introduced into the mixing zone first and said liquid ingredients are added thereafter, said ingredients being introduced into a zone of predominantly axial flow for further movement into a zone of predominantly radial flow.

7. The process of claim 6 wherein following said zone of predominantly radial flow, the flow remains predominantly radial with axial flow interspersed therein throughout the length of the mixing zone.

8. The process of claim 1 wherein the mixing is carried out at a temperature of at least about 140° F.

9. The process of claim 8 wherein said mixing zone contains pairs of radial and axial flow components on parallel shafts rotating together to provide a plurality of pockets of decreasing and increasing volume, the flow components defining small clearances with each other and with the wall of the mixing zone whereby the cheese product mixture is subjected to high shear mixing in flowing from a pocket of decreasing volume to one of increasing volume, said mixing zone having a slenderness ratio of less than 1:3.

10. The process of claim 9 wherein said mixing zone is substantially completely filled to provide a net axial flow of the mixture in said zone.

11. A process for the continuous manufacture of acid-set imitation cheese products from a plurality of dry and liquid cheese making edible ingredients comprising the steps of
    preparing a dry blend of said ingredients which are dry including an edible protein;
    preparing a liquid blend of said ingredients which are liquid including oil, water and acidulant;
    the proportions of said ingredients being those necessary for the manufacture of imitation cheese;
    continuously introducing said dry blend into an elongated, confined mixing zone of small cross-sectional areas;
    continuously introducing said liquid blend into said mixing zone;
    continuously subjecting said blends to medium high intensity mixing while conveying the resulting mixture of said mixing through said zone until a substantially homogeneous mixture is obtained;
    maintaining said mixture at an elevated temperature of at least about 100° F during said mixing;
    continuously withdrawing imitation cheese products from said elongated, confined mixing zone;
    said mixing zone including radial and axial flow, the proportions of said dry blend and liquid blend ingredients producing a substantially incompressible mixture of high viscosity; said mixing being carried out at a net horsepower input at the rate of about 2-5 per 40 pounds of edible ingredients.

12. The process of claim 11 wherein said acidulant is lactic acid and said oil is a hydrogenated vegetable oil, the ingredients and their proportions providing a mixture having an average mixing viscosity in said zone of at least about 75,000 centipoises.

13. The process of claim 11 wherein one of the edible ingredients is an emulsifying agent.

14. The process of claim 11 wherein said dry ingredients are introduced into the mixing zone first and said liquid ingredients are added thereafter, said ingredients being introduced into a zone of predominantly axial flow for further movement into a zone of predominantly radial flow.

15. The process of claim 11 wherein following said zone of predominantly radial flow, the flow remains predominantly radial with axial flow interspersed therein throughout the length of the mixing zone.

16. The process of claim 11 wherein said mixing zone is substantially completely filled to provide a net axial flow of the mixture in said zone.

* * * * *